United States Patent
Park et al.

(10) Patent No.: US 10,953,872 B2
(45) Date of Patent: Mar. 23, 2021

(54) METHOD FOR ESCAPE STEERING CONTROL USING SYSTEM COOPERATION AND VEHICLE THEREOF

(71) Applicants: Hyundai Motor Company, Seoul (KR); Kia Motors Corporation, Seoul (KR)

(72) Inventors: Jae-Il Park, Seoul (KR); Sung-Wook Hwang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 237 days.

(21) Appl. No.: 16/211,577

(22) Filed: Dec. 6, 2018

(65) Prior Publication Data

US 2020/0086856 A1    Mar. 19, 2020

(30) Foreign Application Priority Data

Sep. 18, 2018    (KR) ........................ 10-2018-0111426

(51) Int. Cl.
| | |
|---|---|
| *B60W 30/09* | (2012.01) |
| *B62D 15/02* | (2006.01) |
| *B60W 30/02* | (2012.01) |
| *B60W 30/12* | (2020.01) |

(52) U.S. Cl.
CPC ......... *B60W 30/09* (2013.01); *B62D 15/0265* (2013.01); *B60W 30/02* (2013.01); *B60W 30/12* (2013.01); *B60W 2520/125* (2013.01); *B60W 2520/14* (2013.01); *B60W 2540/18* (2013.01)

(58) Field of Classification Search
CPC ............... B60W 30/09; B60W 15/025; B60W 15/0255; B60W 15/0265; B60W 2520/125; B60W 2520/14; B60W 2520/18; B60W 30/02; B60W 30/12
See application file for complete search history.

(56) References Cited

U.S. PATENT DOCUMENTS

| | | | |
|---|---|---|---|
| 2012/0041658 A1* | 2/2012 | Turner ................. | B60W 10/20 701/68 |
| 2014/0145498 A1* | 5/2014 | Yamakado ............ | B60W 30/02 303/3 |
| 2014/0229069 A1* | 8/2014 | Akiyama .............. | B60W 10/18 701/41 |
| 2017/0029026 A1 | 2/2017 | Okuda et al. | |

* cited by examiner

*Primary Examiner* — Rachid Bendidi
(74) *Attorney, Agent, or Firm* — Morgan, Lewis & Bockius LLP

(57) ABSTRACT

A method for emergency steering control may include system cooperation control in which secondary collision avoidance is performed after forward collision avoidance by cooperatively controlling Emergency Steering Assist System (ESA) control through intervention in control of a Lane Keeping Assist System (LKAS) against excessive steering that causes lane departure in the ESA control when emergency steering is detected by an emergency steering controller in a forward collision situation.

14 Claims, 8 Drawing Sheets

METHOD FOR ESCAPE STEERING CONTROL USING SYSTEM COOPERATION AND VEHICLE THEREOF

CROSS-REFERENCE TO RELATED APPLICATION

The present application claims priority to Korean Patent Application No. 10-2018-0111426, filed on Sep. 18, 2018, the entire contents of which is incorporated herein for all purposes by this reference.

BACKGROUND OF THE INVENTION

Field of the Invention

The present invention relates to emergency steering control of a vehicle, more particularly, to a vehicle that performs emergency steering control in a system cooperation method increasing safety of a vehicle through secondary collision avoidance continuing from primary collision avoidance.

Description of Related Art

Presently, an Emergency Steering Assist System (hereafter, referred to as ESA) and a Lane Keeping Assist System (hereafter, referred to as LKAS) use an emergency steering control technology, avoiding a collision with a preceding vehicle (or obstacle).

For example, the ESA enables quick emergency steering through control reflecting steering intention of a driver for avoiding a collision situation.

For example, LKAS includes an obstacle detector, a lane detector, and an electronic control unit. The obstacle detector detects preceding vehicles (or obstacles), the lane detector detects lane information, and the electronic control unit determines a target steering control amount for avoiding obstacles from the detection information from the obstacle detector and the lane detector. Accordingly, the LKAS stops controlling when the target steering control amount is obtained, and keeps controlling when the target steering control amount is not obtained.

Accordingly, the ESA and the LKAS help stabilization of a vehicle in addition to the performance of avoiding a collision with a preceding vehicle (or obstacle) respectively by performing steering control for a collision situation and by performing steering control continuing from collision avoidance.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing the ESA and the LKAS that implement independent operations between two systems in the same collision situation.

As a result, the LKAS intervenes in control when the ESA is operated in accordance with avoidance intention of a driver in a possible collision situation, whereby the avoidance performance may be deteriorated. Furthermore, even if a driver excessive steers in a stable control situation after collision avoidance, lane keeping by the LKAS is not performed, so safety of the vehicle may be deteriorated and accordingly a secondary collision prevention performance may be deteriorated.

In consideration of these problem, various aspects of the present invention are directed to providing a vehicle provided a method for emergency steering control using system cooperation that improves a forward collision avoidance performance and post-avoidance vehicle safety through chassis integration control using a chassis system when a forward collision danger is detected and a driver steers to avoid the collision, and that satisfies both of avoidance performance deterioration prevention in an avoidance period and secondary collision prevention in a stabilization period by making an LKAS function cooperate with avoidance control and stabilization control of an ESA.

To achieve the object of the present invention, a method for emergency steering control according to an exemplary embodiment of the present invention may include system cooperation control in which secondary collision avoidance is performed after forward collision avoidance by cooperatively controlling ESA control through intervention in control of an LKAS against excessive steering that causes lane departure in the ESA control and performing cooperation control by assisting the ESA control with the LKAS control when emergency steering is detected by an emergency steering controller in a forward collision situation.

As an exemplary embodiment of the present invention, chassis system is chassis integration-controlled in the forward collision situation, and the chassis system is any one of ECS, MDPS, ESC, RWS, and AWD.

As an exemplary embodiment of the present invention, the system cooperation control is classified into driver avoidance determination control in which the emergency steering is determined when the forward collision situation is recognized, system emergency steering control in which the cooperation control is applied in accordance with the excessive steering and lane departure situations in the ESA control, and normal driving control in which the cooperation control is ended due to removal of the forward collision situation and chassis integration control is performed.

As an exemplary embodiment of the present invention, the driver avoidance determination control is performed through a step of detecting vehicle information, a step of creating an emergency flag due to the forward collision situation, and a step of determining the emergency steering by detecting operation of a steering wheel.

As an exemplary embodiment of the present invention, the emergency steering is determined when a threshold is satisfied on the basis of vehicle driving information as a driver intention factor. The vehicle driving information is any one of a steering angle value, a vehicle speed value, a yaw rate error value and a transverse acceleration value, a steering angular speed value, and a transverse acceleration differential value to which the threshold is set.

As an exemplary embodiment of the present invention, the system emergency steering control is performed through a step of performing avoidance period control by the ESA control, a step of determining counter steer, a step of determining lane departure possibility, a post-cooperative system avoidance stable control step of performing secondary collision avoidance after forward collision avoidance by cooperation control, and a step of determining vehicle stabilization for ending the ESA control.

As an exemplary embodiment of the present invention, the emergency steer determination is determined when a threshold is satisfied on the basis of vehicle driving information as a counter steer factor. As an exemplary embodiment of the present invention, the vehicle driving information is any one of a steering angular speed value, a product value of a steering angle and a yaw rate, a vehicle speed value, and a product value of a yaw rate and a transverse acceleration to which the threshold is set.

As an exemplary embodiment of the present invention, when the counter steer determination is not applied and the emergency flag is removed by the forward collision situation, it is converted into post-avoidance stable control, and in the post-avoidance stable control, the ESA control transits from an avoidance period control to a stable control period due to a steering angle change by intervention of the LKAS control. When the counter steer determination is applied and then there is no lane departure possibility, it is converted into post-independent system avoidance stable control, and in the post-independent system avoidance stable control, the ESA control transits from an avoidance period control to a stable control period without intervention of the LKAS control.

As an exemplary embodiment of the present invention, the vehicle stabilization is determined when a threshold is satisfied on the basis of forward collision information and vehicle driving information as driver intention factors. The forward collision information is an emergency flag by the forward collision situation, and the vehicle driving information is any one of a steering angle value, a steering angular speed value, a yaw rate error value, and a timer lapse value to which the threshold is set. Removable of the emergency flag is converted into the normal driving control. The timer lapse value is in the unit of second.

In various aspects of the present invention, a vehicle may include: an emergency steering controller that performs avoidance period control through ESA control when recognizing emergency steering in a collision avoidance signal generation condition according to whether it is a possible forward collision situation, that performs cooperation control of LKAS control for the ESA control when recognizing excessive steering that causes lane departure during the ESA control, and that performs secondary collision avoidance after forward collision avoidance by assisting the ESA control through the LKAS control; and a chassis system that may include any one or more of ECS, an MDPS, ESC, RWS, and AWD, and that performs chassis integration control in the possible forward collision situation.

As an exemplary embodiment of the present invention, the emergency steering controller may include: a recognizer that reads forward collision information, lane departure information, and vehicle driving information as input data, and recognizes a forward obstacle through radar and camera information; a determiner that determines an avoidance period and a stable period together with driver avoidance intention, and a calculator that performs the ESA control and the LKAS control in accordance with the determination of the avoidance period and the stable period.

As an exemplary embodiment of the present invention, the ESA control is performed by the ESA and the LKAS control is performed by the LKAS.

A vehicle of the present invention achieves the following operations and effects by implementing emergency steering control using system cooperation.

First, since chassis integration control is combined with emergency steering control for avoiding a possible forward collision, the forward collision performance of a vehicle and the stability of the vehicle are improved. Second, since the RWS, ECS, ESC, MDPS, and AWD are included in the chassis system that implements chassis integration control, it is possible to implement improved emergency steering control without specific difficulty in all kinds of vehicles.

Third, it is possible to prevent both of avoidance performance reduction in an avoidance period and a secondary collision in a stabilization period by the cooperation strategy using the LKAS function in the avoidance control and stable control of the ESA. Fourth, the intervention in control of the LKAS is improved when the ESA is operated in accordance with driver's avoidance intention in a possible collision situation. Fifth, lane departure is prevented by the LKAS when a driver excessive steers in a stable control situation after collision avoidance.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
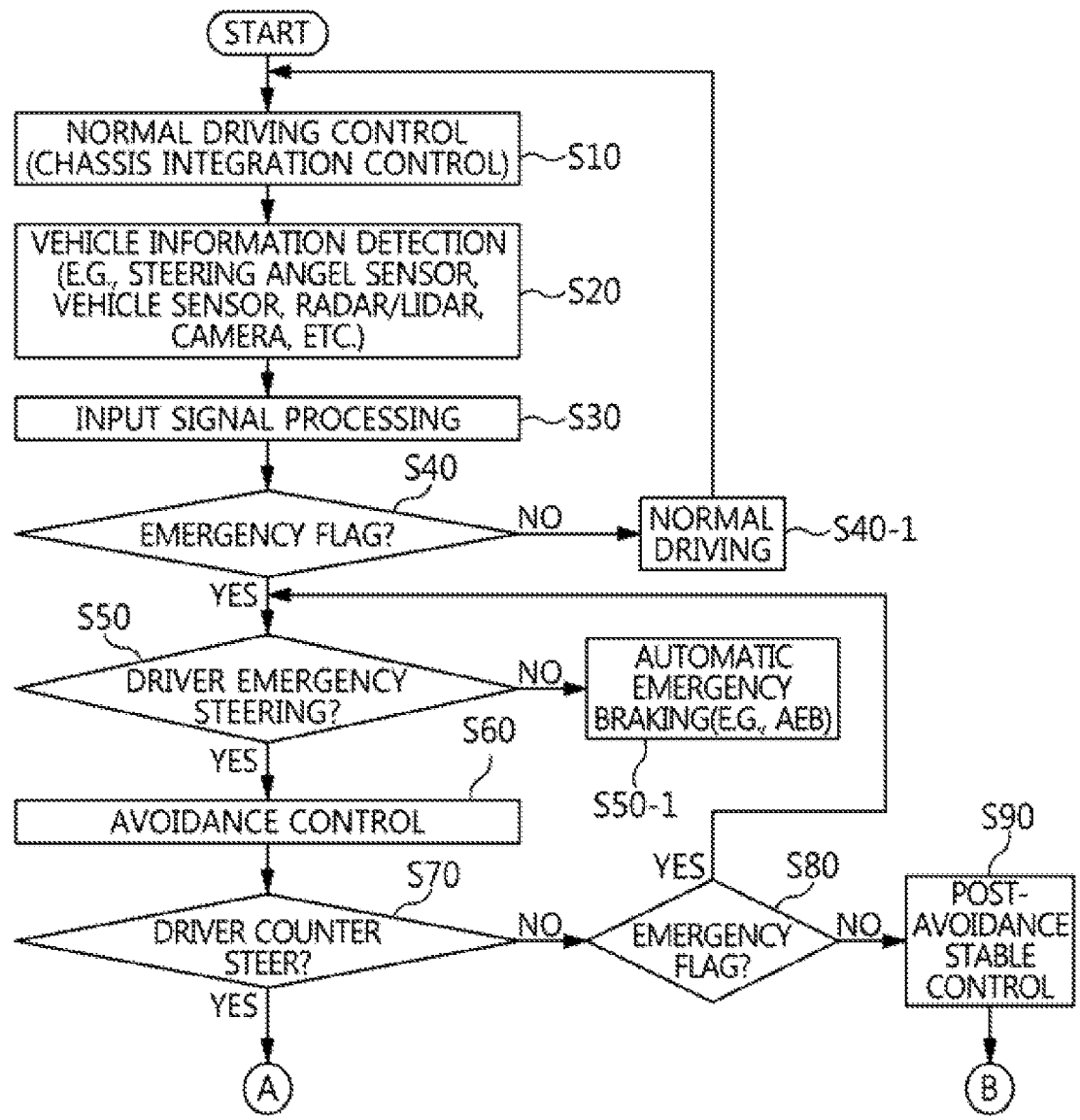
FIG. 1A and FIG. 1B are a flowchart of a method for emergency steering control using system cooperation according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Embodiments of the present invention will be described hereafter in detail with reference to the accompanying drawings and may be implemented in various ways by those skilled in the art, the present invention is not limited thereto.

Figure 1B:
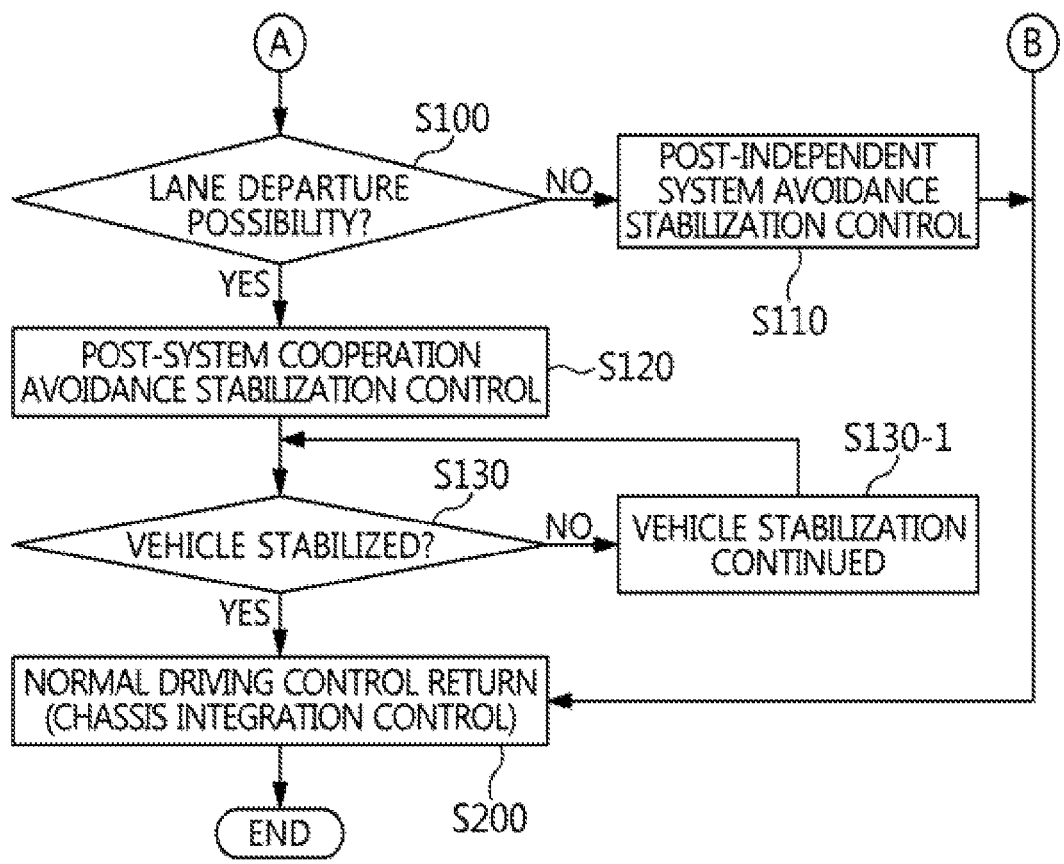

Referring to FIG. 1A and FIG. 1B, a method for emergency steering control is performed by system cooperation control including a chassis system (e.g., RWS, ECS, ESC, MDPS, and AWD), an emergency steering assist system (hereafter, referred to as an "ESA"), and a lane keeping assist system (hereafter, referred to as an "LKAS).

For example, the system cooperation control is implemented by driver avoidance determination control (S20~S50) and system emergency steering control (S60~S130) in which a forward collision avoidance performance and post-avoidance vehicle stability are increased between normal driving control of a vehicle (S10) and normal driving control return (S200).

Accordingly, the normal driving control (S10) means chassis integration control which is performed by a chassis system (e.g., RWS, ECS, ESC, MDPS, and AWD) when a vehicle is driven, and the normal driving control return (S200) means chassis integration control that controls driving of a vehicle after ESA and LKAS intervene in control when a collision situation is removed.

In the driver avoidance determination control (S20~S50), emergency steering is attempted by a driver for automatic emergency braking determination in a collision avoidance signal (e.g., emergency flag #1, #2, #3) condition according to whether it is a possible forward collision situation. Furthermore, in the system emergency steering control (S60~S130), post-avoidance stabilization control (S90), post-independent system avoidance stabilization control (S110), and a post-cooperative system avoidance stabilization control (S90) are performed after avoidance period control is performed due to entering the avoidance control (S600 from the chassis integration control (S50).

The emergency steering control method is divided into an emergency steering control method using system cooperation. In the emergency steering control using system cooperation, when a possible forward collision is detected and a driver performs emergency steering to avoid a collision, the forward collision avoidance performance of a vehicle and the stability of the vehicle without departing from a lane after avoidance may be improved by cooperation control of ESA and LKAS linked to the chassis system in the chassis integration control state.

Figure 2:
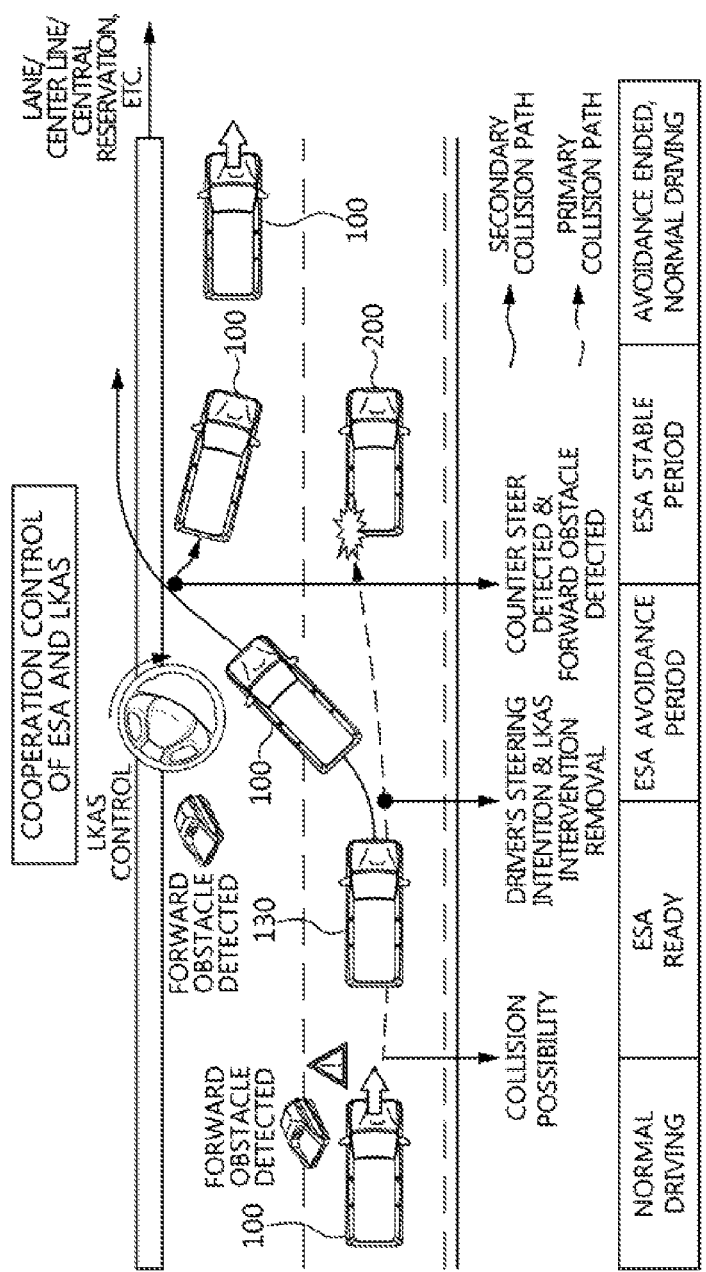
FIG. 2 is a diagram showing a driving state of a vehicle through emergency steering control using system cooperation according to an exemplary embodiment of the present invention.

Referring to FIG. 2, a state in which a vehicle 100 which is in a possible collision situation with a preceding vehicle 200 safely escapes from a post-collision secondary collision while avoiding the preceding vehicle 200 through emergency steering control using system cooperation of the emergency steering controller 1.

In the instant case, normal driving is a driving situation without a collision possibility, ESA Ready is a collision possibility recognition situation, an ESA avoidance period is an emergency steering (emergency period control) situation escaping a collision situation through independent control of the ESA 20 by removable of intervention by the LKAS with steering intention of a driver, an ESA stable period is a stable control (stable period control) situation escaping from a secondary collision situation by cooperation control of the ESA 20 and the LKAS 30 when counter steer is detected and a forward obstacle (or next lane or center lane) is detected, and avoidance end is a situation in which the vehicle 100 has completely escaped from the secondary collision situation. In the cooperation control of the ESA 20 and the LKAS 30, the LKAS prevents lane departure (secondary collision) which may be caused by excessive steering or counter steer, by intervening in control, so a steering angle is changed by the intervention of the LKAS control and ESA stable control is performed.

Figure 3:
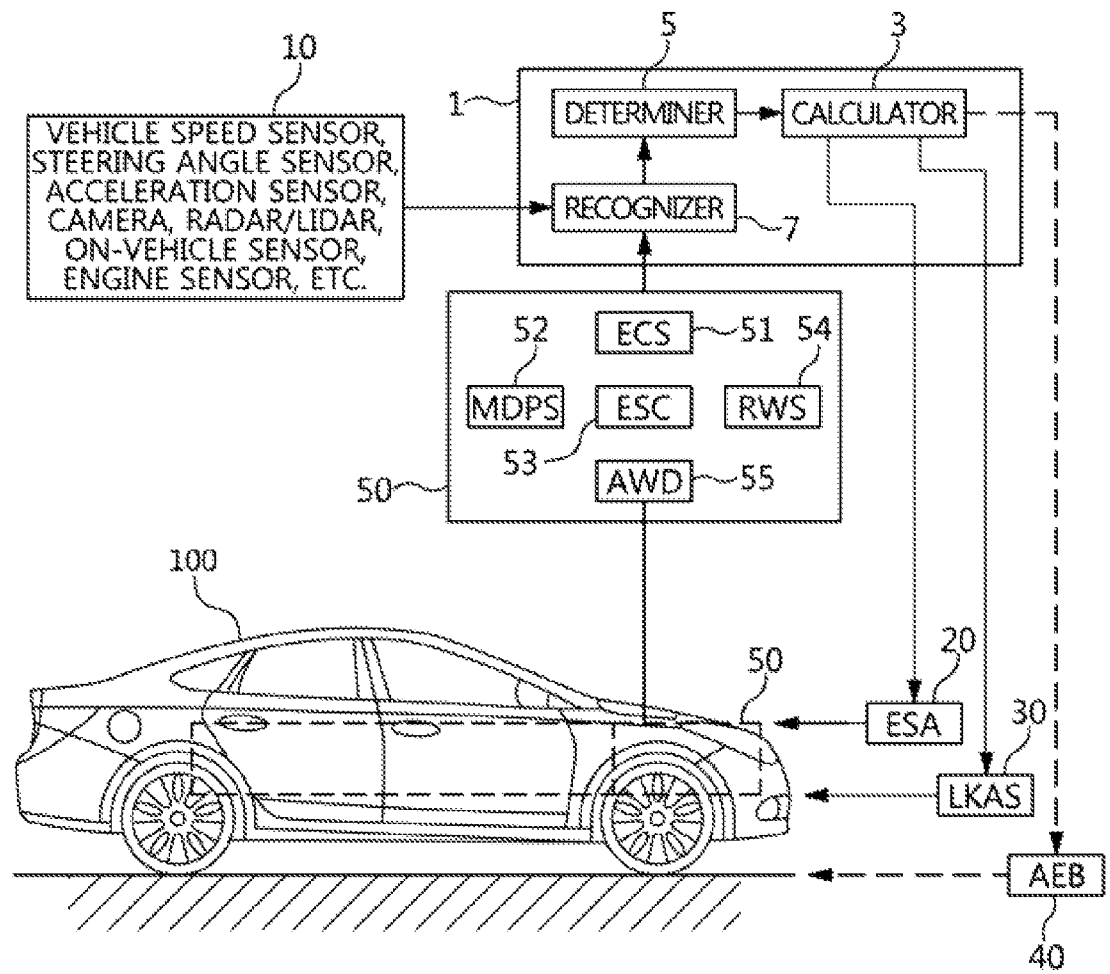
FIG. 3 is a diagram showing example of a vehicle in which emergency steering control using system cooperation according to an exemplary embodiment of the present invention is implemented.

Referring to FIG. 3, the vehicle 100 includes the emergency steering controller 1, a sensor unit 10, an ESA 20, an LKAS 30, an autonomous emergency brake (AEB) 40, and a chassis system 50.

In detail, the sensor unit 10 is connected to all systems of the vehicle 100 through a vehicle communication network, the emergency steering controller 1 collects sensor signals and outputs system control signals. In the instant case, the vehicle communication network may be implemented by at least one of a Controller Area Network (CAN), a Local Interconnect Network (LIN), FlexRay, and Media Oriented System Transport (MOST).

The emergency steering controller 1 includes a recognizer 3, determiner 5, and a calculator 7, and outputs an ESA control amount and LKAS control amount by reading forward collision information, lane departure information, and vehicle driving information as input data. The main function of the recognizer 3 is to recognize forward obstacles using information from a radar and a camera on the vehicle 100. The main function of the determiner 5 is to determine an avoidance period and a stabile period together with avoidance intention of a driver using the vehicle driving information and the lane departure information related to the vehicle 100. The main function of the calculator 7 is to perform ESA control and LKAS control in accordance with the determination of the avoidance period and the stable period.

In detail, the sensor unit includes sensors mounted on the vehicle 100 such as a vehicle speed sensor, a steering angle sensor, an acceleration sensor, a camera, a radar, a lidar, a vehicle driving sensor, and an engine sensor. A vehicle speed, a steering angle, a steering angular speed, transverse acceleration, transverse speed differential value, a yaw rate, a yaw rate error value, a camera image signal, an engine torque, and radar/lidar distance detection signals are generated respectively by the sensors. The detection signals of the sensor unit 10 are used as input information in the emergency steering controller 1.

In detail, the ESA 20 implements a driver assist function to implement quick emergency steering through steering control to which steering intention of a driver for avoiding a collision situation is reflected. The LKAS 30 implements a function of performing lane keeping control or giving a warning of lane departure by detecting a lane and detecting the driving state of the vehicle so that the vehicle does not depart the detected lane. The AEB 40 performs emergency braking through a control strategy established by itself even without reaction by a user when sudden braking of a preceding vehicle detected by the sensors.

In detail, the chassis system 50 includes an Electronic Control Suspension (ECS) 51, a Motor Driven Power Steering System (MDPS) 52, Electronic Stability Control (ESC) 53, Rear Wheel Steering (RWS) 54, and All Wheel Drive (AWD) 55. The ECS 51 implements front/rear wheel damper control against oversteer/understeer of the vehicle. The MPDS 52 implement assist torque gain control for transverse avoidance for improving steering response. The ESC 53 implement torque vectoring control against oversteer/understeer. The RWS 54 implements rear wheel steering unlike front wheel steering. The AWD 55 implements torque distribution control against oversteer/understeer.

The method for emergency steering control using system cooperation of FIG. 1A and FIG. 1B are described in detail with reference to FIGS. 3 to 7. In the instant case, the subject of control is the emergency steering controller 1 and the target of control is all systems of the vehicle 100 or the ESA 10 and the LKAS 30 that are main targets of control.

Figure 4:
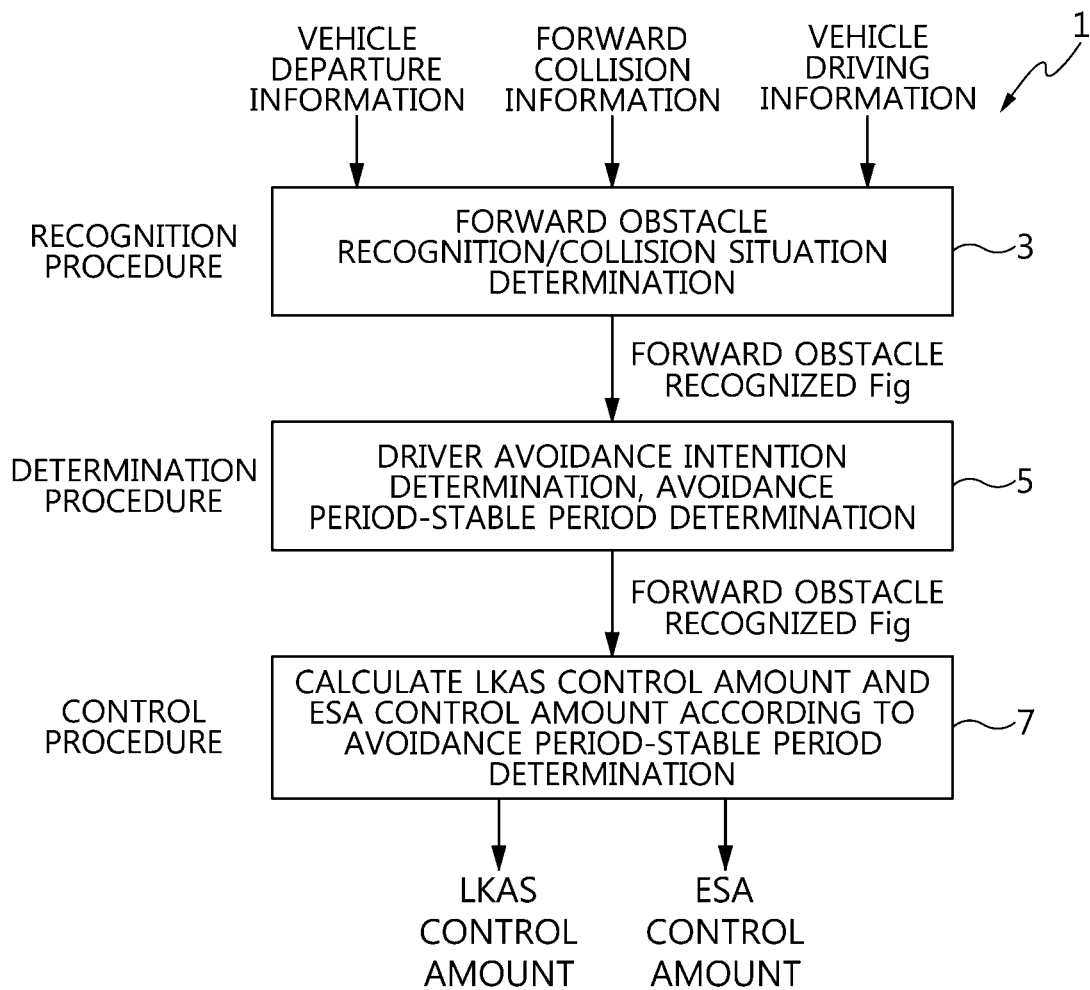
FIG. 4 is a diagram showing an operation state of an emergency steering controller in emergency steering control using system cooperation according to an exemplary embodiment of the present invention.

Referring to FIG. 4, the emergency steering controller 1 detects an operation state of the chassis system 50 through the recognizer 3 and reads forward collision information, lane departure information, and vehicle driving information as input data from the sensor unit 10. It recognizes a forward obstacle using radar and camera information related to the input data, generates an emergency flag according to recognition of a forward obstacle, and then determines emergency steering intention of a driver from a steering angle and a steering angular speed.

Accordingly, the emergency steering controller 1 enters the driver avoidance determination control (S20~S50) in a chassis integration control state of the normal driving control (S10), and then performs the driver avoidance determination control (S20~S50) through a vehicle information detection step S20, an input signal processing step S30, a collision avoidance signal generation step S40, and driver emergency steering determination step S50.

The vehicle information detection step S20 includes a vehicle speed, a steering angle, a steering angular speed, transverse acceleration, transverse acceleration differential value, a yaw rate, a yaw rate error value, a camera image signal, an engine torque, and radar/lidar distance detection signals. The input signal processing step S30 recognizes a forward obstacle using the radar and camera information as input signals. The collision avoidance signal generation step S40 recognizes a possible forward collision situation from the vehicle speed and the following distance and then generates emergency flags classified into Time to collision (TTC) classes (e.g., emergency flags #1, #2, #3) as collision avoidance signals. The driver emergency steering determination step S50 checks the intention of the driver for steering or avoiding, using the steering angle or the steering angular speed.

In the instant case, in the emergency flags #1, #2, #3, the Flg #1 shows a warning situation, the emergency Flg #2 shows a situation requiring partial braking, and the emergency Flg #3 shows full brake situation, but the defined situations may be appropriately changed, if necessary. Furthermore, for the intention of a driver, predetermined values of a vehicle signal and a determination signal such as the steering angle and the steering angular sped are set as thresholds and when the intention exceeds the values, it is determined as steering intention.

However, in the collision avoidance signal generation step S40, when a possible forward collision situation is not recognized, it is determined as normal driving, as in S40-1, so that the process returns to the vehicle information detection step S20. Furthermore, in the driver emergency steering determination step S40, when driver's intention is not recognized, the AEB 40 is operated, as in S50-1, so emergency braking control (see FIG. 2) for escaping from the possible forward collision situation is performed.

Figure 5:
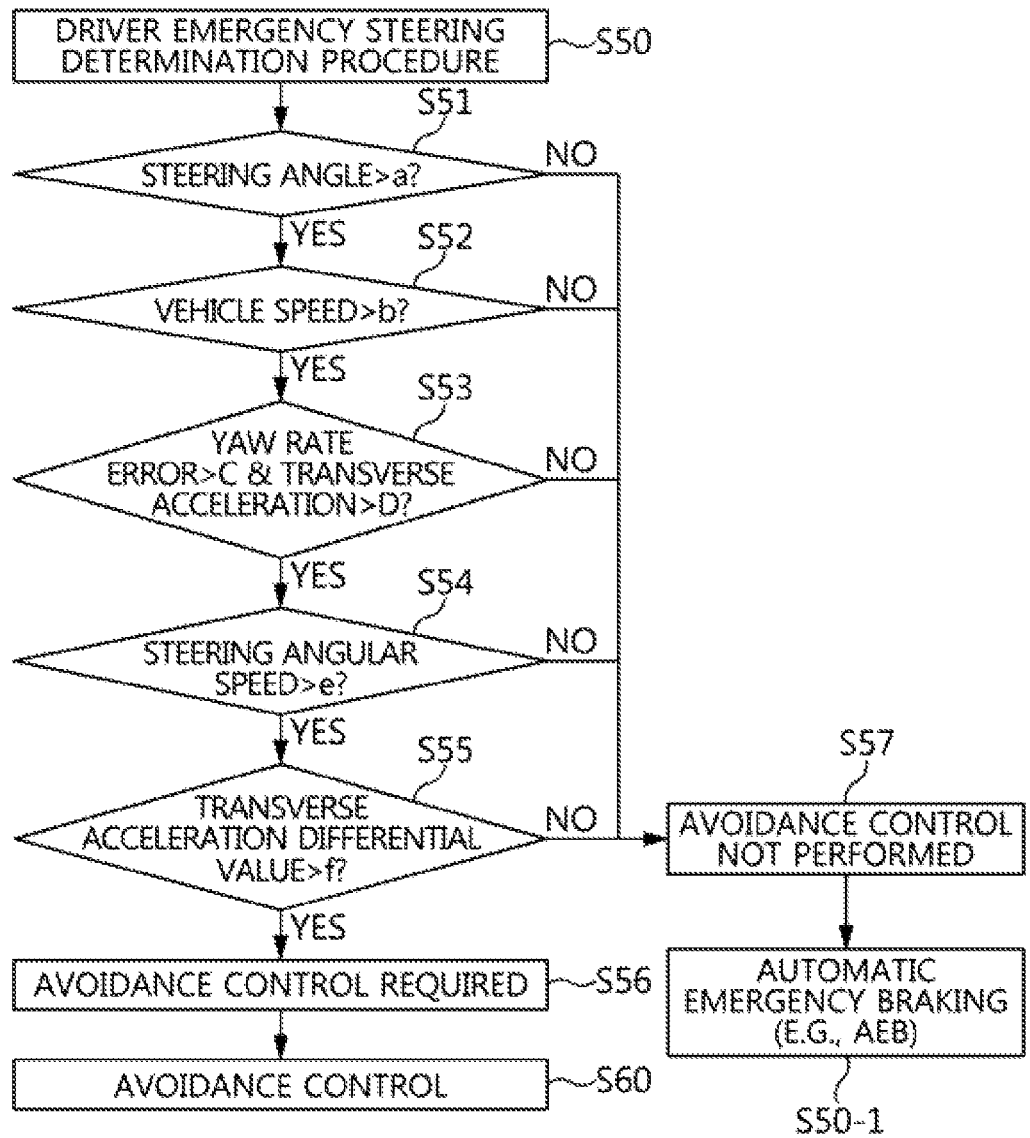
FIG. 5 is a flowchart showing a driver emergency steering determination process according to an exemplary embodiment of the present invention.

Referring to FIG. 5, the driver emergency steering determination step S50 is performed through steering angle determination S51, vehicle speed determination S52, yaw rate error and transverse speed determination S53, steering angular speed determination S54, transverse speed differential value determination S55, avoidance control performing necessity determination S56, and avoidance control non-performing determination S57.

Determination of a steering angle >a in the steering angle determination S51, a vehicle speed >b in the vehicle speed determination S52, a yaw rate error >c & transverse acceleration in the yaw rate error and transverse speed determination S53, a steering angular speed >e in the steering angular speed determination S54, a transverse acceleration differential value >f in the transverse speed differential value determination S55, are performed. The "a" is a steering angle threshold of about 10 deg/s, "b" is a vehicle speed threshold of about 30 kph, "c" is a yaw rate error threshold of 0.87, "d" is a transverse acceleration threshold of 0, "e" is a steering angular speed threshold of about 50 deg/s, and "f" is a transverse speed differential value threshold of 2. ">" is a sign of inequality showing the magnitudes of two values.

As a result, a steering angle over the steering angle threshold, a vehicle speed over the vehicle speed threshold, a yaw rate error over the yaw rate error threshold and a transverse acceleration over the transverse acceleration threshold, a steering angular speed over the steering angular speed threshold, and a transverse speed differential value over the transverse speed differential value threshold are determined. When the values are over the conditions, respectively, the system emergency steering control (S60~S130) is started by the avoidance control performing necessity determination S56, of when the values are less than the conditions, respectively, an automatic emergency braking control 50-1 is started by the avoidance control non-performing determination S57.

Referring to FIG. 3, the emergency steering controller 1 utilizes the determiner 5 and the calculator 7 for the system emergency steering control (S60~S130). The determiner 5 determine an avoidance period and a stable period according to the avoidance intention of a driver, using the vehicle driving information and the lane departure information related to the vehicle with the emergency flags generated. The determiner 5 can generate flags for discriminating the avoidance intention from the determination angles in the avoidance period and the stable period. The recognizer 3 determines the ESA control amount and the LKAS control amount according to the avoidance intention and the determination of the avoidance period and the stable period, controls the ESA 20 on the basis of the ESA control amount, and controls the LKAS 30 on the basis of the LKAS control amount.

To the present end, the emergency steering controller 1 performs an avoidance control step S60, a driver counter steer determination step S70, a lane departure possibility determination step S100, a post-system cooperation avoidance stable control step S120, and a vehicle stable determination step in which EAS control is finished S130, to assist the chassis integration control S10 that controls the chassis system 50 in accordance with the emergency flags for the system emergency steering control (S60~S130). The driver counter steer determination step S70 may be converted into post-avoidance stable control step S90 through an emergency flag check step S80. The lane departure possibility determination step S100 may be converted into the post-independent system avoidance stable control S110. The vehicle stabilization determination step S130 may be maintained in a vehicle stabilization maintaining step.

In the instant case, the avoidance control step S60, the post-avoidance stable control S90, the post-independent system avoidance stable control S110, and the post-system cooperation avoidance stable control step S120 are determined as follows.

The avoidance control 60 is avoidance period control in which only ESA control is performed on the ESA 20 by steering intention of a driver, so that the LKAS 30 is not controlled. Accordingly, in the avoidance period control, the intervention in control by the LKAS is ended, so forward obstacle avoidance assist for the driver is performed by ESA control with the possibility of LKAS control intervention is precluded in avoiding.

The post-avoidance stable control S90 performs ESA stable control according to a change in steering angle after LKAS control intervention. Accordingly, the post-avoidance stable control S90 returns to the steering determination step when there is an emergency flag (that is, an emergency flag is maintained) without counter steer, but intervenes in control through the LKAS 30 when there is no emergency flag (that is, an emergency flag is removed), so lane keeping is started the ESA avoidance period transits to the stable control period due to a change in steering angle by the LKAS control intervention. Thereafter, it is converted into the normal driving control return S200 in which vehicle control is performed without forward collision possibility.

In the post-independent system avoidance stable control S110, the LKAS 30 is not operated, so ESA stable control is performed without LKAS control intervention. Accordingly, in the post-independent system avoidance stable control S110, the ESA avoidance period transits to the stable control period in a driver steering state without possibility of lane departure after counter steer. Thereafter, it is converted into the normal driving control return S200 in which vehicle control is performed without forward collision possibility.

In the post-system cooperation avoidance stable control step S120, the LKAS 30 is operated, so ESA stable control cooperation control is performed with LKAS control intervention. Accordingly, in the post-system cooperation avoidance stable control step S120, when there is possibility of lane departure due to excessive steering by a driver after counter steer, lane departure prevent is performed with LKAS control intervention, and the ESA avoidance period transits to the stable control period until it is determined that the vehicle is stabilized after avoidance. Thereafter, it is converted into the normal driving control return S200 in which vehicle control is performed without forward collision possibility.

Figure 6:
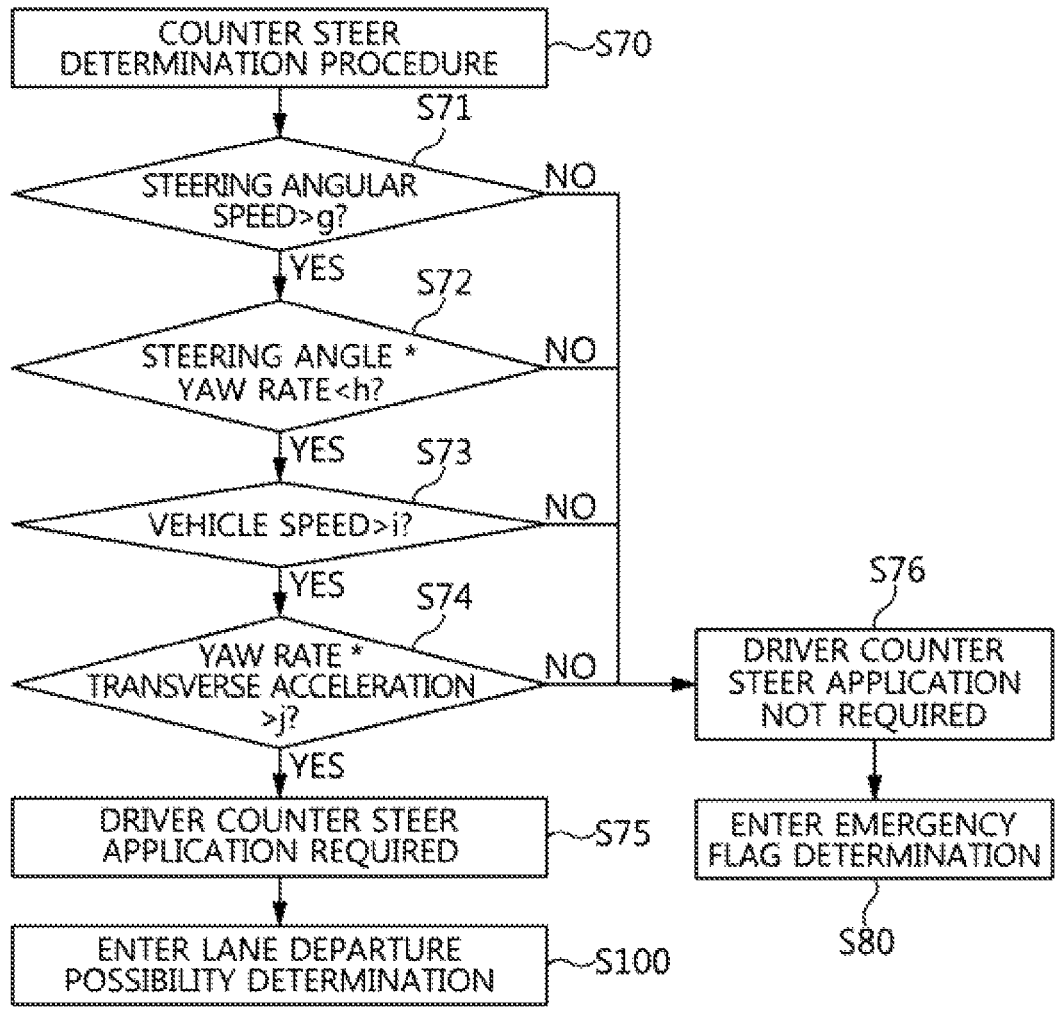
FIG. 6 is a flowchart showing a process of determining counter steer according to an exemplary embodiment of the present invention.

Referring to FIG. 6, the driver counter steer determination step S70 is performed through steering angular speed determination S71, a steering angle and yaw rate value determination S72, vehicle speed determination S73, yaw rate and transverse acceleration value determination S74, driver counter steer application determination S75, and driver counter steer non-application determination S76.

Determination of a steering angular speed >g in the steering angular speed determination S71, steering angle*yaw rate <h in the steering angle and yaw rate value determination S72, a vehicle speed <i in the vehicle speed determination S73, and yaw rate*transverse acceleration >j in the yaw rate and transverse acceleration value determination S74, are performed.

The "g" is a steering angular speed threshold of about 100 deg/s, "h" is a product threshold of a steering angle and a yaw rate of about 0, "i" is a vehicle speed threshold of 30 kph, and "j" is product threshold of a yaw rate and transverse acceleration. ">" and "<" are signs of inequality showing the magnitudes of two values and "*" is a sign of product of two values.

As a result, a steering angular speed over the steering angular speed threshold, a product threshold of a steering angle and a yaw rate over the product threshold of a steering angle and a yaw rate, a vehicle speed threshold over the vehicle speed threshold, and a product threshold of a yaw rate and a transverse acceleration over the product threshold of a yaw rate and transverse acceleration are determined. When the values are over the conditions, respectively, the process enters the lane departure possibility determination step S100 through the driver counter steer application determination S75, and when the values are less than the conditions, the process enters an emergency flag check S80 through the driver counter steer non-application determination S76.

Figure 7:
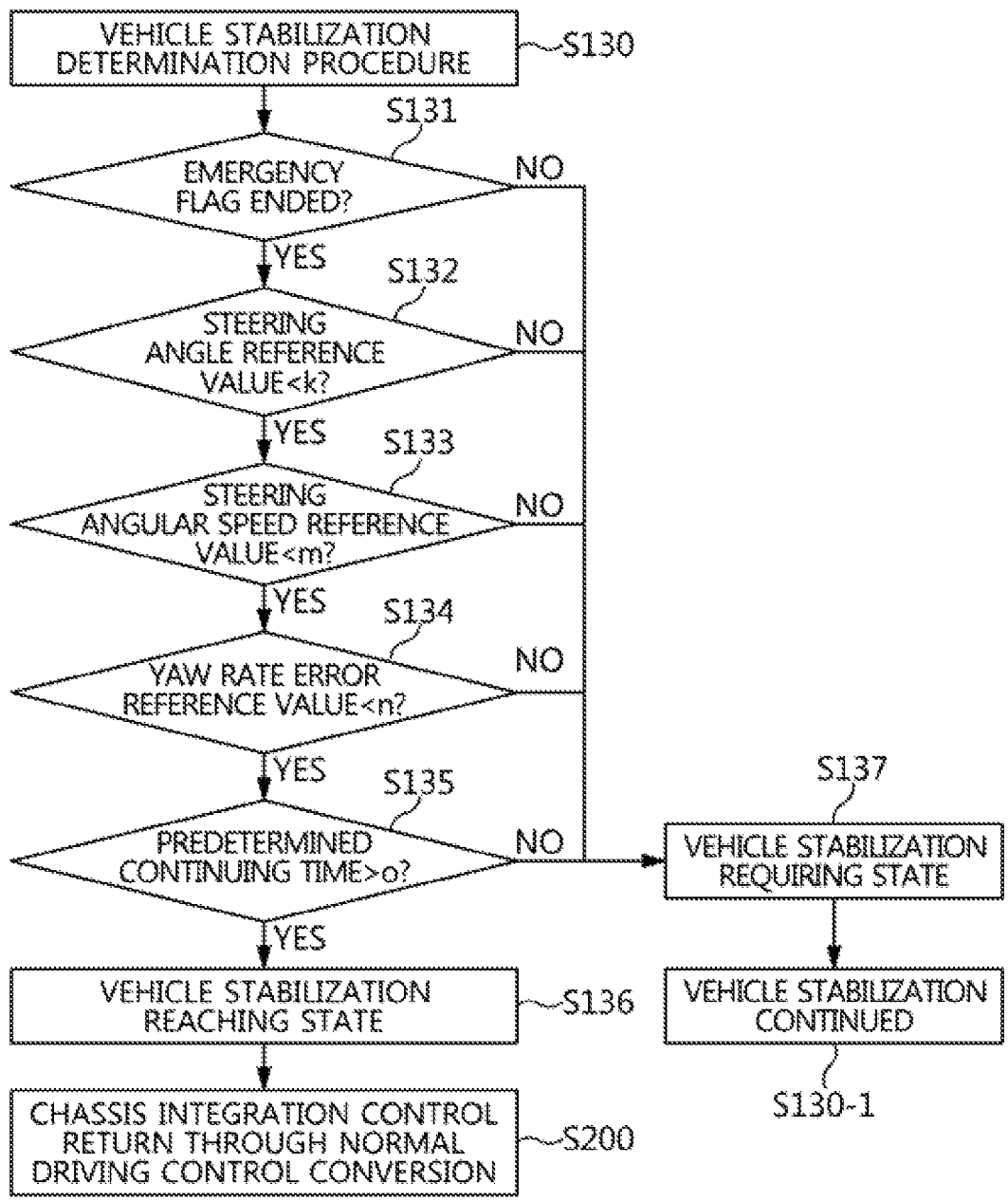
FIG. 7 is a flowchart showing a process of determining vehicle stabilization according to an exemplary embodiment of the present invention.

Referring to FIG. 7, the vehicle stabilization determination step S130 is vehicle stabilization determination after primary and secondary avoidance to finish the avoidance control and is performed through emergency flag end portion determination S131, steering angle determination S132, steering angular speed determination S133, yaw rate error determination S134, timer lapse determination S135, vehicle stabilization completion determination S136, and vehicle stabilization requirement determination S137.

An emergency flag is removed by ending emergency in the emergency flag end portion determination S131, a steering angle >k in the steering angle determination S132, a steering angular speed >m in the steering angular speed determination S133, a yaw rate error >n in the yaw rate error determination S134, and a predetermined continuing time >o in the timer lapse determination S135. "k" is a steering angle threshold of about 10 deg/s, "m" is a steering angular speed threshold of about 50 deg/s, "n" is a yaw rate error threshold of 0.87, and "o" is a continuing time threshold of 3 seconds. ">" is a sign of inequality showing the magnitudes of two values.

As a result, emergency flag removal, a steering angle over the steering angle threshold, a steering angular speed over the steering angular speed threshold, a yaw rate error over the yaw rate error threshold, and a predetermined continuing time over the continuing time threshold are determined. When the values are less than the conditions, respectively, without the emergency flag removed, the vehicle stabilization control S130-1 is continued, but when the values are over the conditions with the emergency flag removed, the post-system cooperation avoidance stable control step S120 is ended and it transits to the normal driving control return S200.

As described above, according to the vehicle 100 of the exemplary embodiment, when the emergency steering controller 1 recognizes emergency steering by a driver when there is possibility of forward collision in the chassis integration control state of the chassis system 50, avoidance period control is performed through ESA control, cooperation control of LKAS control for the ESA control is performed when excessive steering that causes lane departure is recognized during ESA control, and the forward collision avoidance performance and post-avoidance vehicle stability are improved by the chassis system by performing emergency steering control using system cooperation that performs secondary collision avoidance after avoiding a forward collision by assisting the ESA control with the LKAS control. The control function of the LKAS 30 is cooperated with the avoidance control and stable control of the ESA 20, whereby it is possible to prevent avoidance performance reduction in an avoidance period and a secondary collision in a stabilization period.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for emergency steering control of a vehicle, the method comprising:
   performing system cooperation control, by a chassis system, in which a secondary collision avoidance is performed after a forward collision avoidance by cooperatively controlling Emergency Steering Assist System (ESA) control through intervention in control of a Lane Keeping Assist System (LKAS) against a steering that causes lane departure of the vehicle in the ESA control when emergency steering is detected by an emergency steering controller in a forward collision situation,
   wherein the emergency steering is determined when a first threshold is satisfied on a basis of first vehicle driving information as a driver intention factor, and
   wherein the first vehicle driving information includes a steering angle value, a vehicle speed value, a yaw rate error value, a transverse acceleration value, a steering angular speed value, and a transverse acceleration differential value to which the first threshold is set.

2. The method of claim 1,
   wherein the chassis system is chassis integration-controlled in the forward collision situation, and
   wherein the chassis system includes Electronic Control Suspension (ECS), a Motor Driven Power Steering System (MDPS), Electronic Stability Control (ESC), Rear Wheel Steering (RWS), and All Wheel Drive (AWD).

3. The method of claim 1, wherein the system cooperation control includes:
   driver avoidance determination control of determining the emergency steering when the forward collision situation is recognized;
   system emergency steering control of applying the system cooperation control in accordance with excessive steering and lane departure situations in which the steering causes the lane departure of the vehicle during the ESA control; and
   normal driving control of ending the system cooperation control due to removal of the forward collision situation.

4. The method of claim 3, wherein the driver avoidance determination control is performed through a step of detecting vehicle information, a step of creating an emergency flag due to the forward collision situation, and a step of determining the emergency steering by detecting operation of a steering wheel.

5. The method of claim 3, wherein the system emergency steering control is performed through a step of performing avoidance period control by the ESA control, a step of determining counter steer, a step of determining lane departure possibility, a post-cooperative system avoidance stable control step of performing the secondary collision avoidance after the forward collision avoidance by the system cooperation control, and a step of determining vehicle stabilization for ending the ESA control.

6. The method of claim 5, wherein the emergency steering is determined when a second threshold is satisfied on a basis of second vehicle driving information as a counter steer factor.

7. The method of claim 6, wherein the second vehicle driving information includes the steering angular speed value, a product value of the steering angle value and a yaw rate, the vehicle speed value, and a product value of the yaw rate and a transverse acceleration to which the second threshold is set.

8. The method of claim 5,
   wherein, when determination of the counter steer is not applied and an emergency flag is removed by the forward collision situation, the system cooperation control is converted into a post-avoidance stable control, and
   wherein in the post-avoidance stable control, the ESA control transits from an avoidance period control to a stable control period due to a steering angle change by intervention of the LKAS control.

9. The method of claim 5,
   wherein, when the determination of the counter steer is applied and there is no lane departure possibility, the system cooperation control is converted into a post-independent system avoidance stable control, and
   wherein, in the post-independent system avoidance stable control, the ESA control transits from an avoidance period control to a stable control period without intervention of the LKAS control.

10. The method of claim 5, wherein the vehicle stabilization is determined when a third threshold is satisfied on a basis of forward collision information and third vehicle driving information as driver intention factors.

11. The method of claim 10, wherein the forward collision information is an emergency flag by the forward collision situation, and the third vehicle driving information includes the steering angle value, the steering angular speed value, the yaw rate error value, and a timer lapse value to which the third threshold is set.

12. The method of claim 11, wherein removal of the emergency flag is converted into the normal driving control.

13. A vehicle comprising:
   the emergency steering controller configured to execute the method of claim 1, wherein the emergency steering controller is configured:
      to perform avoidance period control through the ESA control when recognizing the emergency steering in a collision avoidance signal generation condition according to a time in which there is a possible forward collision situation;
      to perform cooperation control of the LKAS control for the ESA control when recognizing an excessive steering that causes the lane departure during the ESA control; and to perform the secondary collision avoidance after the forward collision avoidance by assisting the ESA control through the LKAS control; and the chassis system that includes at least one of Electronic Control Suspension (ECS), an Motor Driven Power Steering System (MDPS), Electronic Stability Control (ESC), Rear Wheel Steering (RWS), and All Wheel Drive (AWD), and that is configured to perform chassis integration control in the possible forward collision situation.

14. The vehicle of claim 13, wherein the ESA control is performed by an Emergency Steering Assist System and the LKAS control is performed by the LKAS.

* * * * *